United States Patent [19]

Hare, Sr.

[11] Patent Number: 5,019,119
[45] Date of Patent: May 28, 1991

[54] ELECTRO-RHEOLOGICAL FUEL INJECTOR

[76] Inventor: Nicholas S. Hare, Sr., 252 Pineville Rd., Monroeville, Ala. 36460

[21] Appl. No.: 481,308

[22] Filed: Feb. 16, 1990

Related U.S. Application Data

[63] Continuation-in-part of Ser. No. 405,769, Sep. 11, 1989, abandoned, which is a continuation-in-part of Ser. No. 399,178, Aug. 28, 1989, Pat. No. 4,930,463, which is a continuation-in-part of Ser. No. 339,748, Apr. 18, 1989, abandoned.

[51] Int. Cl.$^5$ ............................................. F02M 37/04
[52] U.S. Cl. ..................................... 123/500; 123/506
[58] Field of Search ................. 123/500, 501, 503, 506

[56] References Cited

U.S. PATENT DOCUMENTS

| | | | |
|---|---|---|---|
| 4,235,374 | 11/1980 | Walter et al. | 123/500 |
| 4,445,484 | 5/1984 | Marion | 123/506 |
| 4,449,500 | 5/1984 | Kawatei et al. | 123/503 |
| 4,653,448 | 3/1987 | Ohmori et al. | 123/501 |
| 4,700,678 | 10/1987 | Elliott | 123/297 |

Primary Examiner—David A. Okonsky
Assistant Examiner—Weilun Lo
Attorney, Agent, or Firm—Ferrill and Logan

[57] ABSTRACT

A fuel injector controlled by electro-rheological valving is disclosed. The present invention comprises a cylindrical casing having a compression chamber for holding a metered quantity of fuel and a nozzle for injecting said fuel into an engine; a fuel inlet for supplying a metered quantity of fuel to said compression chamber; an outlet coupled to said compression chamber for permitting fuel to exit said chamber to be recirculated back to said inlet; reciprocating plunger means for driving compression fluid into said nozzle and outlet; and electro-rheological valve means for controlling the flow of fuel through said outlet whereby the amount of fuel injected into said nozzle is precisely metered.

25 Claims, 14 Drawing Sheets

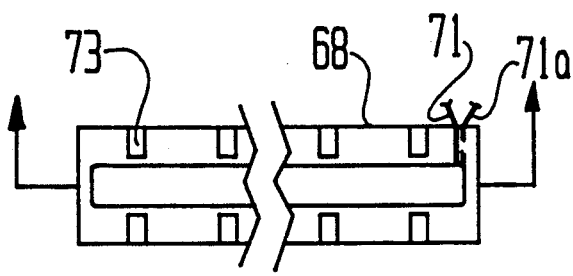
FIG. 4D
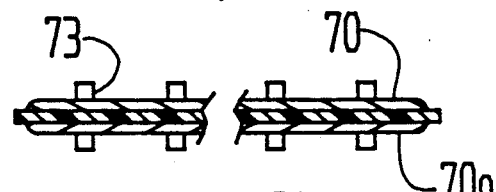
FIG. 4C
FIG. 4A
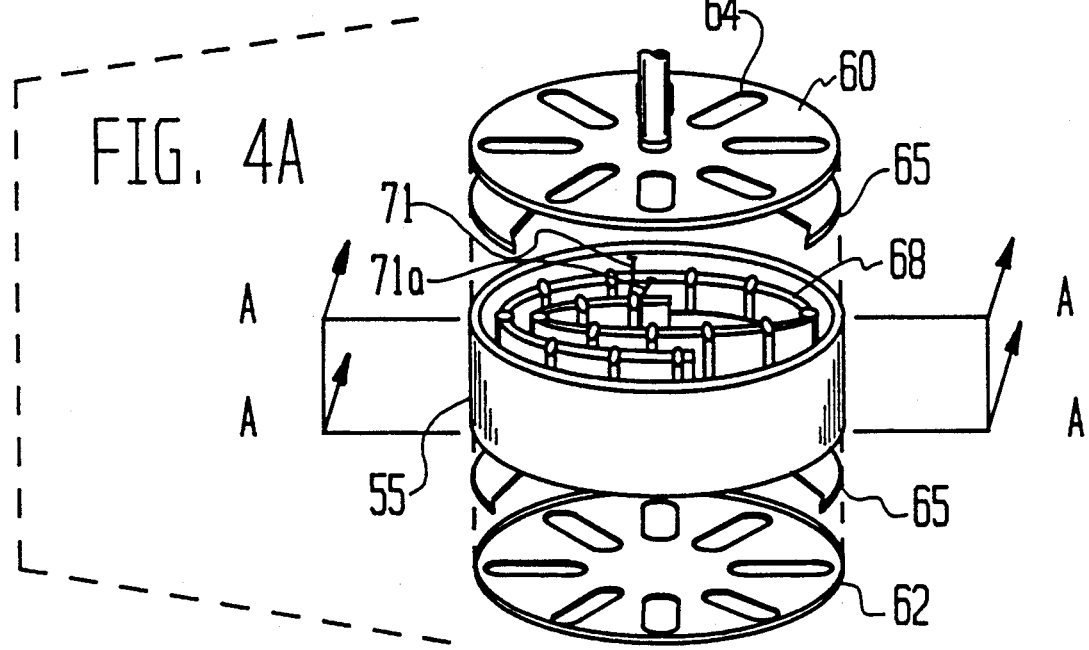
FIG. 4B
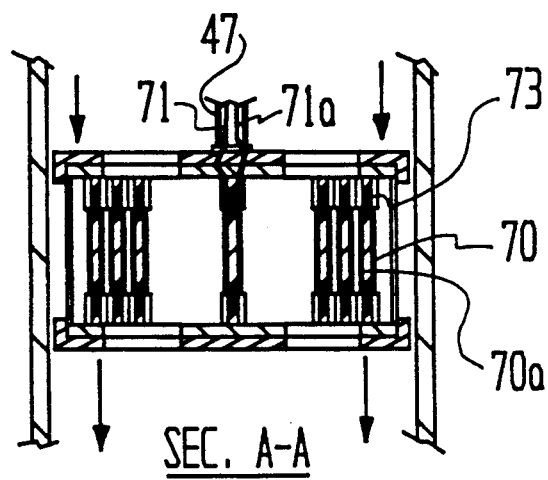
SEC. A-A FIG.10A
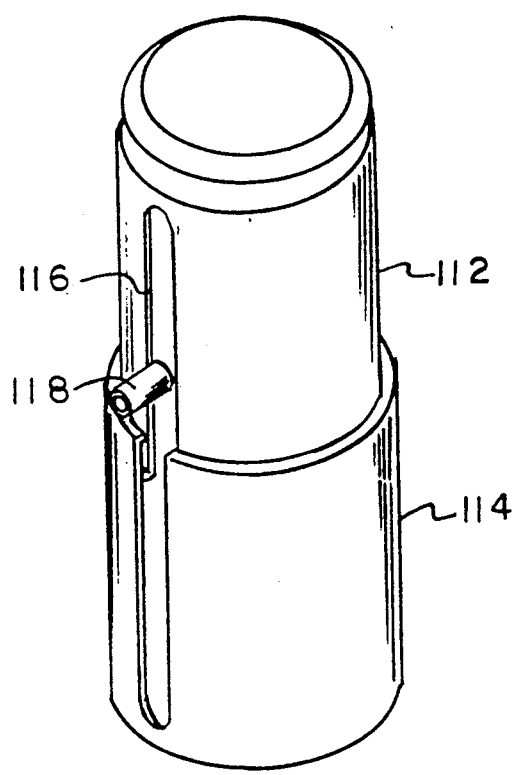
FIG.10B
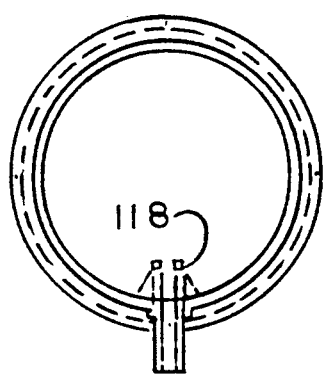
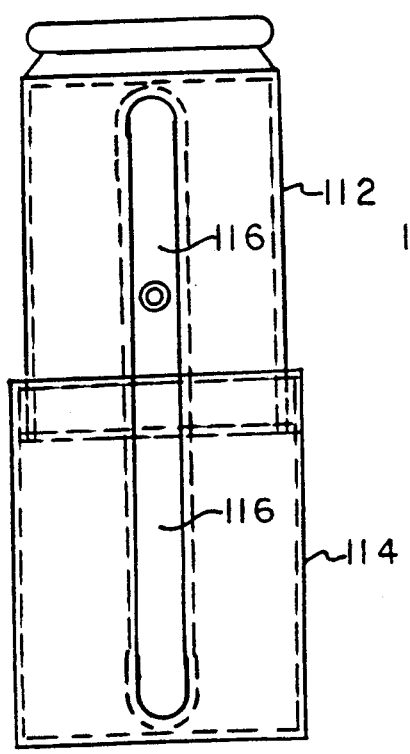
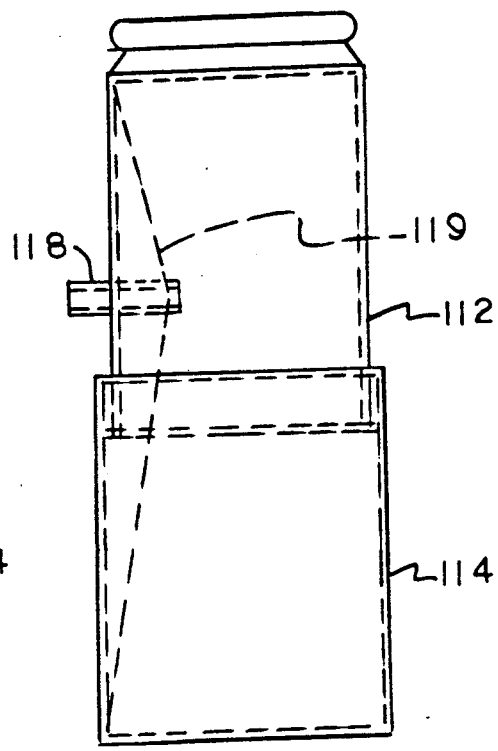
FIG.10C  FIG.10D

ELECTRO-RHEOLOGICAL FUEL INJECTOR

RELATED APPLICATIONS AND CLAIM OF PRIORITY

This application is a continuation-in-part of co-pending U.S. Ser. No. 405,769 filed Sept. 11, 1989, now abandoned, which is a continuation-in-part of U.S. Ser. No. 399,178, filed Aug. 28, 1989, now U.S. Pat. No. 4,930,463, which is a continuation-in-part of co-pending U.S. Ser. No. 339,748, filed Apr. 18, 1989, now abandoned.

FIELD OF THE INVENTION

The present invention is directed to an electro-rheological fuel injector. Specifically, the present invention is directed to an electro-rheological fuel injector for precisely metering the quantities of fuel injected into a diesel or gasoline powered engine.

BACKGROUND OF THE INVENTION

Fuel injectors are required to deliver closely calibrated quantities of fuel in rapid succession under extreme conditions of pressure and temperature. Because of the great demands placed upon them, fuel injectors are typically complex and expensive to manufacture. The present invention utilizes the properties of electro-rheological fluids to minimize both the complexity and cost of fuel injectors, while at the same time, providing improved operation, fuel efficiency, and performance.

Various forms of compression operated fuel injectors have been developed. In the more recent of these prior art devices, the injection of fuel has been controlled electronically or by mechanical activation. Typically, these devices use solenoid valves to control the timing and the amount of fuel to be supplied. Examples of compression operated injectors include U.S. Pat. Nos. Re. 23,476 to French; Re. 29,978 and U.S. Pat. No. 3,926,169 to Leshner, et al; and U.S. Pat. No. 1,995,469 to Olsen. Electronic and mechanical fuel injectors typically require electro-magnetic or electronic apparatus to control the injection event. This equipment is complex and expensive.

It has been recognized for several decades that certain fluids respond to the influence of an electric potential by evidencing a rapid and pronounced increase in viscosity and an increased resistance to shear. Such electro-rheological or electroviscous fluids comprise slurries of finely divided hydrophilic solids in hydrophobic liquids. In the absence of an electric field, these fluids behave in a Newtonian fashion. But, when an electric field is applied, the fluids become proportionately more viscous as the potential of the electric field increases. In strong electric fields, these fluids can thicken into a solid. The electro-rheological phenomenon reverses when the electric potential is removed, and the material returns to its fluid state.

Electro-rheological fluids change their characteristics very rapidly when electric fields are applied or released, with typical response times being on the order of one millisecond. The ability of electro-rheological fluids to respond rapidly to electrical signals makes them well suited as elements in mechanical devices. Patents directed to compositions of electro-rheological fluids include U.S. Pat. Nos. 3,367,872; 3,047,507 and 4,033,892. Electro-rheological fluids have been extensively used in clutches as disclosed, for example, in U.S. Pat. Nos. 4,444,298 and 4,493,615, and more recently in dampening devices and hydraulic applications.

Until recently, the practical application of electro-rheological fluids was limited to low temperature environments due to the previously required presence of water in the electro-rheological fluid. In a high temperature environment, the water in the fluid would vaporize and lead to corrosion. This strictly limited the use of electro-rheological fluids toward low temperature applications on or near gasoline and diesel powered automobile and truck engines and the like. Recently, the temperature problem has been minimized with advances in electro-rheological fluid technology such as those disclosed in U.S. Pat. Nos. 4,744,914 and 4,772,407. Electro-rheological devices, because of their special nature, offer numerous advantages over mechanical valve control devices incorporating hydraulic, solenoid and cam operated action, such as that utilized in conventional fuel injectors.

Recently, an electro-rheological fuel injector was disclosed in U.S. Pat. No. 4,700,678 to Elliott. The fuel injector disclosed by Elliott is complicated and utilizes relatively large quantities of electro-rheological fluids. In addition, the injector disclosed in U.S. Pat. No. 4,700,678 has a tendency to accumulate dirt and debris. It also requires a complex by-pass mechanism for controlling the thrust of the injector and the duration of the injection event.

It would be desireable to have a simplified fuel injector which can utilize electro-rheological fluid to precisely meter an amount of fluid into an engine, and which improves over designs such as that disclosed by Elliott in U.S. Pat. No. 4,700,678.

It would further be desirable to have an electro-rheological fuel injector with valving which utilize novel electrode configurations, and which can more easily and more precisely meter quantities of fuel into the engine.

It is therefore an object of the present invention to provide an electro-rheological fuel injector which can be utilized to precisely meter and control the levels and amounts of fuel fed to an engine from a fuel injector and which can easily replace a conventional fuel injector, and which does not tend to accumulate dirt and debris.

It is a further object of the present invention to provide an electro-rheological fuel injector which can be constructed less expensively than standard fuel injectors and which can be utilized to precisely control the amount of thrust of a plunger member utilized in association with an electro-rheological fluid.

It is still a further object of the present invention to provide an electro-rheological fuel injector which can replace conventional fuel injectors in both automobile and diesel engines.

It is still a further object of the present invention to provide an electro-rheological fuel injector which utilizes novel valve mechanisms which control the timing and duration of an injection event.

SUMMARY OF THE INVENTION

A fuel injector controlled by electro-rheological valving comprising a cylindrical casing having a compression chamber for holding a metered quantity of fuel and a nozzle for injecting said fuel into an engine; a fuel inlet for supplying a metered quantity of fuel to said compression chamber; an outlet coupled to said compression chamber for permitting fuel to exit said chamber to be recirculated back to said inlet; reciprocating plunger means within said casing for driving compression fluid into said nozzle and outlet; and electro-rheological valve means for controlling the flow of fuel through said outlet whereby the amount of fuel injected into said nozzle is precisely metered.

BRIEF DESCRIPTION OF THE FIGURES

The foregoing summary, as well as the following detailed description will be better understood when read in conjunction with the drawings appended hereto. For the purpose of illustrating the invention, there is shown in the drawings an embodiment which is presently preferred, it being understood, however, that this invention is not limited to the precise arrangement and instrumentalities shown.

FIG. 4 illustrates an exploded view of a spiral ring electrode which can be utilized in the biased open and biased closed valves of the present invention.

FIG. 4B is a section view of the spiral ring electrode configuration utilized in the preferred embodiment.

FIG. 4C is a plan view of the spiral electrode along line A—A of FIG. 4A.

FIG. 4D is a section view of the spiral electrode configuration utilized in the preferred embodiment.

FIG. 10A is an isometric view of the telescoping plunger utilized in the embodiment of FIG. 9.

FIG. 10B is a plan view of the telescoping plunger utilized in the embodiment of FIG. 9.

FIG. 10C is a perspective view of the telescoping plunger of the embodiment of FIG. 9.

FIG. 10D is a second perspective view of the telescoping plunger of the embodiment of FIG. 9.

DESCRIPTION OF THE PREFERRED EMBODIMENT

Figure 1:
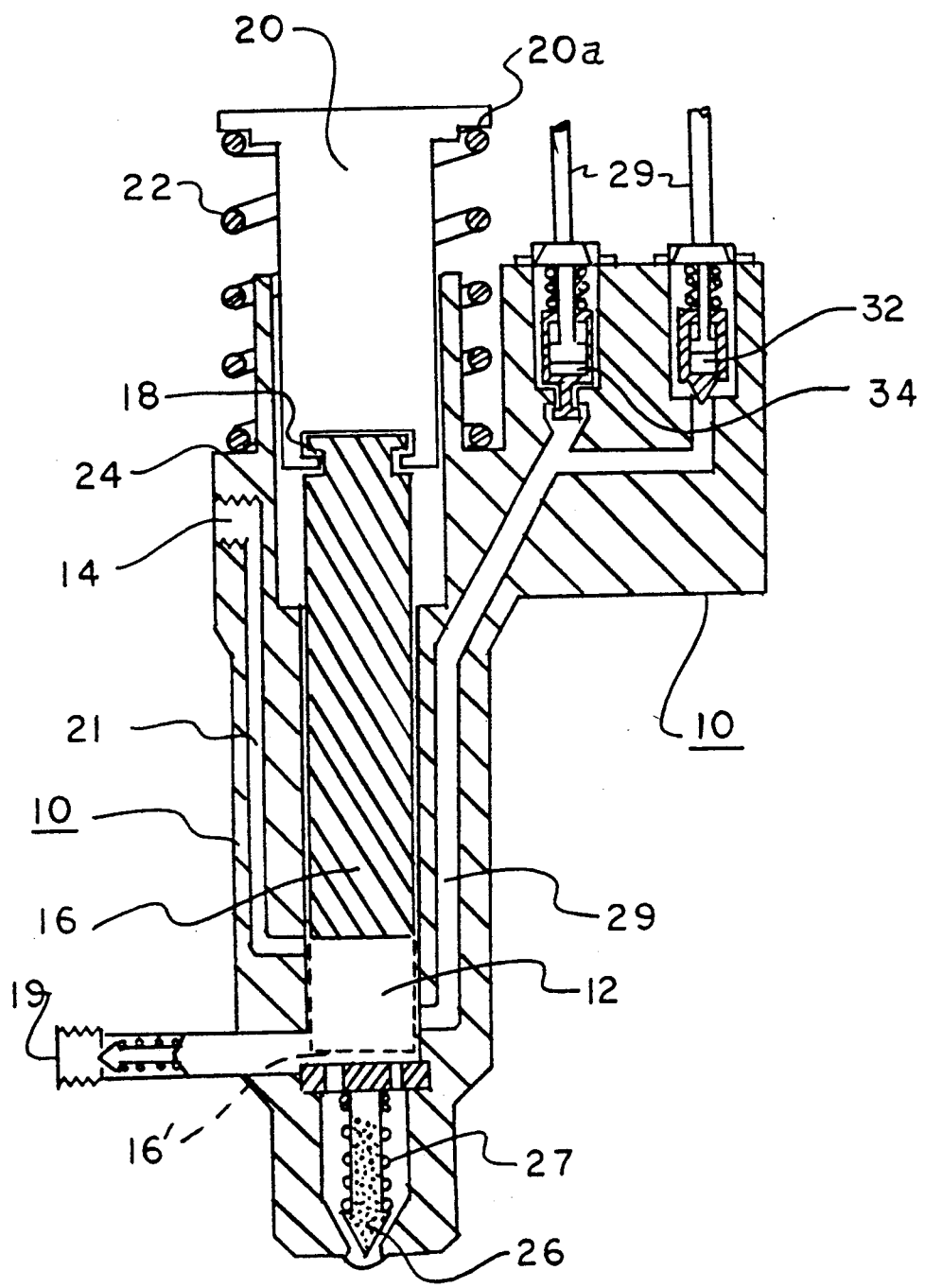
FIG. 1 is a section view of the fuel injector of the present invention.
Figure 2:
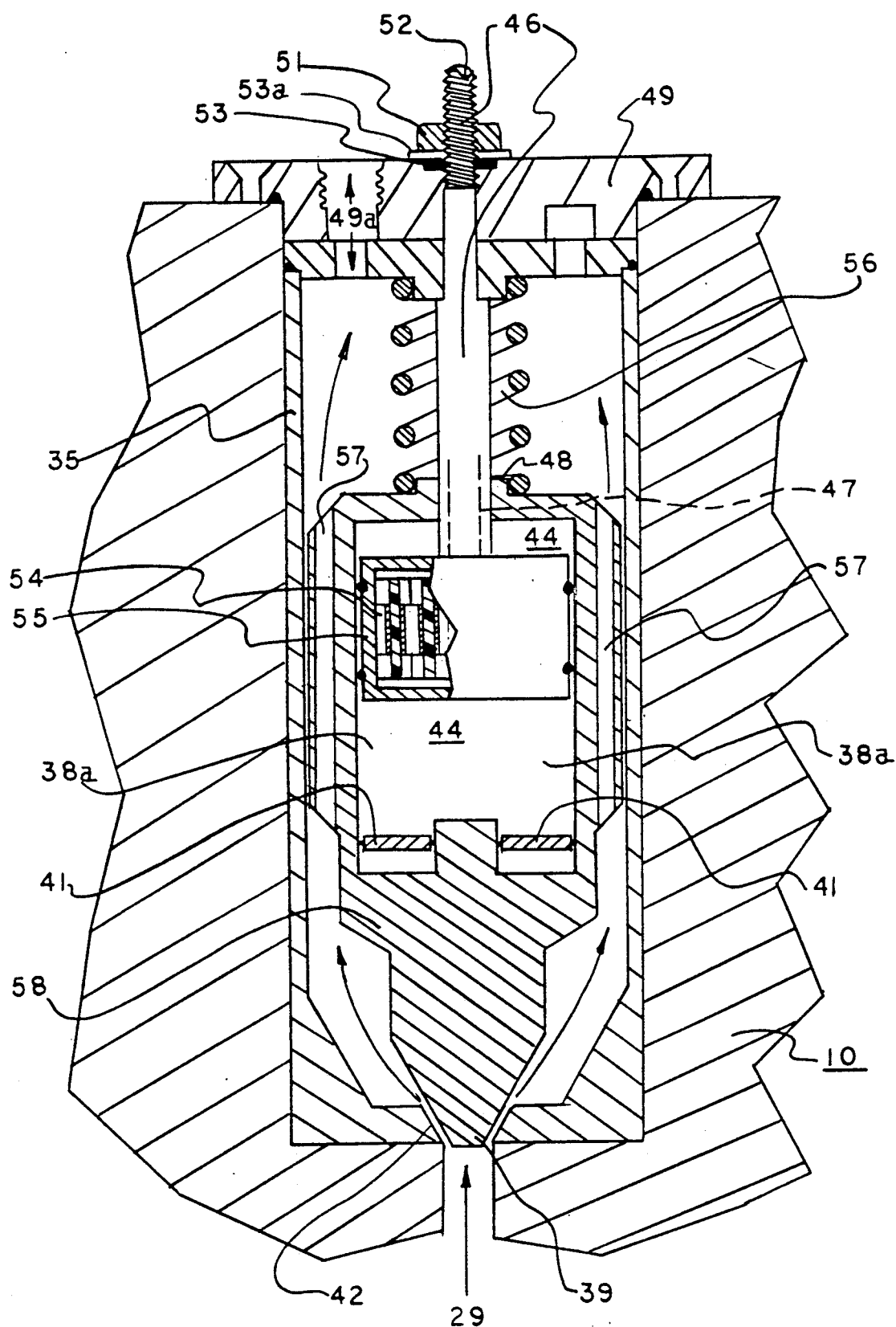
FIG. 2 is an isolated section view of the biased closed valve of the preferred embodiment.
Figure 3:
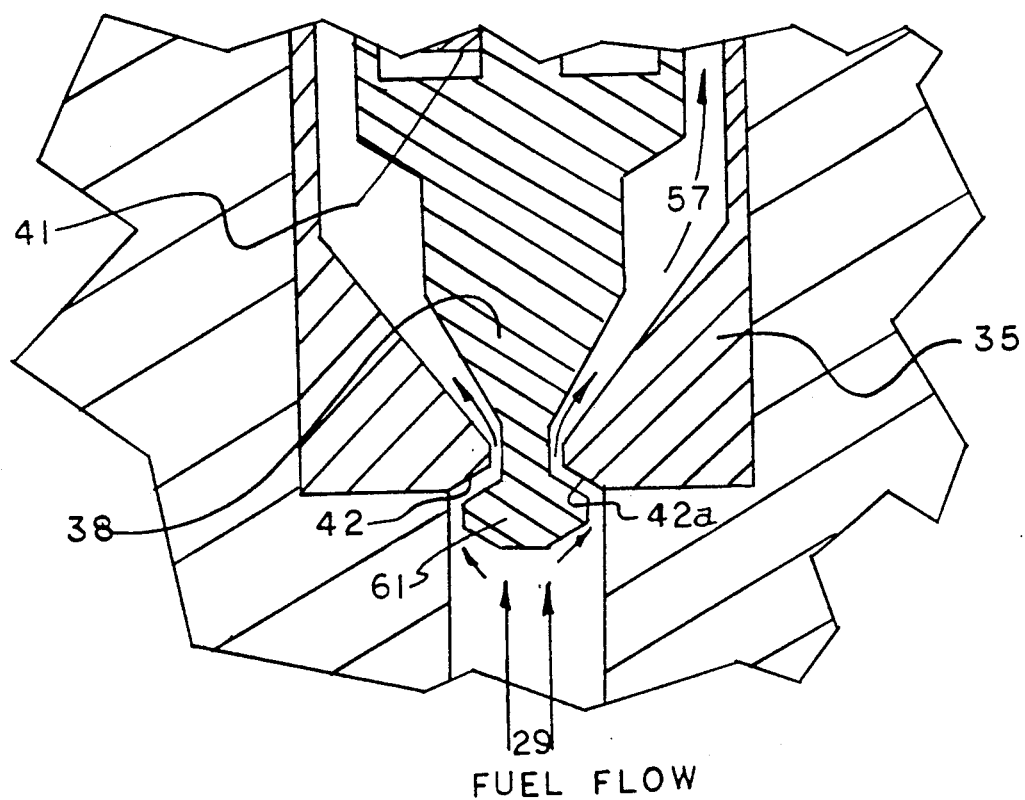
FIG. 3 is a section view of the biased open electro-rheological valve of the present invention.

The present invention is described with reference to the enclosed Figures wherein the same numbers are used where applicable. Referring to FIGS. 1, 2, and 3, the fuel injector and electro-rheological valving of the present invention is shown and described. The present invention comprises a casing 10 which houses a fuel injection chamber 12, fuel inlet 14 and plunger 16. The casing 10 may be constructed from a variety of materials, including steel, brass, or other materials utilized for the construction of engine parts. The casing supports a plunger 16 which reciprocates within the casing. The plunger 16 is attached by a dove-tail socket 18 to a piston member 20. The piston 20 and associated plunger 16 operate as a single reciprocating unit. The plunger and piston members are biased upward by a biasing spring 22 which is retained by an annular stop 24 which extends along the outside of the casing 10 and by a ridge 20a on the piston 20. The plunger and attached piston member are activated by a cam, solenoid, engine compression pressure, engine oil pressure, pneumatic pressure, or other conventional activation device which imparts an oscillatory motion.

A fuel line 14 feeds fuel into the injection chamber 12 located within the casing. The present invention also utilizes a needle injection valve 26 which is located downstream of the injection chamber 12 and which is utilized to inject the fuel into the engine cylinder. The needle valve 26 is biased downward by a biasing spring 27. As the fluid pressure in the injection chamber increases, the needle valve 26 is thrust upward, thereby permitting fuel injection.

The casing 10 further includes a fuel outlet and recirculation conduit 29 which recirculates fuel back into the fuel system via electro-rheological control valves 32, 34 to be discussed in greater detail below. Finally, the fuel injector incorporates a check valve controlled fuel supply 19 which is located at the base of the compression or injection chamber 12. The fuel supply 19 permits fuel to be drawn in on the upstroke of the piston and plunger, and thereby prevents the creation of a vapor lock which would result because of the gap between the floor of the injection chamber 12 and the point of maximum plunger thrust. It is to be appreciated by those skilled in the art that fuel supply 19 can function as the main fuel and supply line 14 can alternatively function as a fuel outlet. It is to be appreciated that fuel circulation is important for proper cooling and vapor lock prevention.

The recirculation line feeds into electro-rheological control valves which regulate the flow of fluid back into the system. The valves 32, 34 utilized in accordance with the present invention are shown in greater detail in FIGS. 2 and 3. The present invention utilizes two electro-rheological control valves 32, 34 which regulate the quantities of the fuel recirculated back to the fuel system. By controlling the recirculated fuel and the injection timing, the injection pressure and quantities of fuel within the injection chamber can be precisely metered.

Valve 32 of FIG. 1 comprises a housing 35 which encases an electro-rheological control valve 36 which is biased in a closed direction. The valve comprises a floating head 38 with a land 39 which slidably mates with a valve seat 42 located at the mouth of the recirculation fuel line 29. The floating head 38 oscillates in a longitudinal direction with respect to an arm member 46. The arm houses a rod 47 (see hashed lines of FIG. 2)

which encases electrode wires 52. The center of the head 38a is hollow and contains electro-rheological fluid 44. The arm 46 extends through the center of the valve and through a central bore 48 into the cavity 38a. The arm is retained by a retaining plate 49, threaded gland 51, pressure seal 53 and ring washer 53a. The arm 48 contains electrode wires 52 which extend through the center of the chamber. Attached to the arm 48 is a disk-shaped perforated electrode member 54 retained within a cylindrical casing or housing 55.

The valve oscillates with respect to the electrode member 54 and having 55. A biasing spring 56 biases the valve outward toward the closed position. The valve body 38 contains an annular conduit 57. Annular conduit 57 permits fuel flow from the valve seat 42 to a port or outlet 49a situated on the end plate and from there, back to the fuel system.

The biased closed valve 32 is an electro-rheological valve which, in operation, is forced inward due to fluid pressure exerted on its face 39 from conduit 29. This pressure is opposed by the biasing spring 56. In operation, as pressure on the recirculation line 29 increases (coinciding with an injection event), the valve member 39 is thrust inward and the biasing spring 56 contracts. The valve moves with respect to the stationary arm member and perforated electrode 54. The annular flow conduit 57 permits fuel to flow between the valve seat 42 and the outlet 49a. Fuel enters the valve, goes through an annular flow channel 57 and exits through port 49a to be recirculated into the fuel line. By applying an electric potential to the electrode 54 within the valve casing, the perforated electrode solidifies the electro-rheological fluid contained therein. Movement of electro-rheological fluid with the chamber 38a is impeded and the position of the valve is locked. Accordingly, a back pressure is created in line 29 and a greater injection event results.

Referring to FIG. 3, valve 34 is an electro-rheological control valve which is biased open. The internal operation of the valve is identical to that shown and disclosed in FIG. 2. The valve has a valve extension 61 which extends into the fuel return line 29. When fuel pressure from the fuel line pushes up against the extension and forces the extension against a valve seat 42a located at the opening of the valve chamber. When the valve mates with the valve seat, flow through the valve is terminated. By varying the timing, duration and intensity of the electrical impulse to the valve electrode 54, the position of the extension is locked.

As noted, the electrode within each valve is perforated so as to permit the free flow of electro-rheological fluid therethrough. Electro-rheological fluids comprise slurries of finely divide hydrophilic solids in hydrophobic liquids. In the absence of an electric field, these fluids behave in a Newtonian fashion, but when an electric field is applied, the fluids become proportionately more viscous as the potential of the electric field increases. In strong electric fields, these fluids thicken into a solid. The phenomenon reverses when the electric potential is removed, and the material returns to its fluid state. Electrorheological fluids change their characteristics very rapidly when electric fields are applied or released, with typical response times being on the order of one millisecond. The ability of electro-rheological fluids to respond rapidly to electrical signals makes them well suited as elements in mechanical devices. Patents directed to compositions of electro-rheological fluids include U.S. Pat. Nos. 3,367,872; 3,047,507; and 4,033,892.

There are numerous electro-rheological fluids which have been developed. Preferably, the present invention should be utilized with electro-rheological fluids which are designed to operate in high temperature environments such as those disclosed in U.S. Pat. Nos. 4,744,914 and 4,772,407, and which are incorporated herein by reference.

The electrode configurations to be utilized in the electro-rheological control valves shown in FIGS. 2 and 3 are described with reference to FIGS. 4, 5, 6, and 7. While the present invention is designed to utilize one of the four electrode configurations, in each of the embodiments, a perforated or flowthrough member contains a sequence of electrodes which when activated by an electronic impulse, generate a plurality of electric fields which solidify the electro-rheological fluids within the perforations, and prevent the fluid from flowing through the solidified member. The solidified member located within the valve chamber 38a prevents the flow of electro-rheological fluid, creates a fluid back pressure and thereby locks the position of the valve member in either an open, intermediate or closed position.

As shown in FIG. 4A–4D, the first flow through member comprises hollow cylindrical housing 55 of FIG. 2 having respective top and bottom plates 60, 62, each having a plurality of elongated radial apertures 64. The top and bottom plates 60, 62 each compress respective perforated insulative layers 65. The perforations of the insulative layers align with apertures on the top and bottom plates. The housing 55 contains a spiral thermally resistant polymer, mylar or plastic band or coil 68 which is coated with a metallic electrode 70, 70a on each of its sides. The metallic coatings 70, 70a can consist of copper, aluminum, silver, nickel or any other electrically conductive material. The band turns are separated by plastic ribs 73 which create both channels for fluid flow as well as maintain the electrical integrity of the coil. At the center of the spiral, one metallic band 70 is connected to a positive terminal 71 with the other being connected to a negative terminal 71a. The electric wiring may extend through hollow arm 46 (FIG. 4B). As shown in FIG. 4B, the spiral coil thus effectively forms a wound alternating sequence of positive and negative terminals. When the electrodes 70, 70a are activated, fluid flowing through the apertures is solidified by the electric field formed between the walls of the spiral coil. The reciprocating flow through plunger member thus becomes a solid plunger which applies a downward thrust against the remaining electro-rheological fluid contained within the valve cavity 38a.

Figure 5:
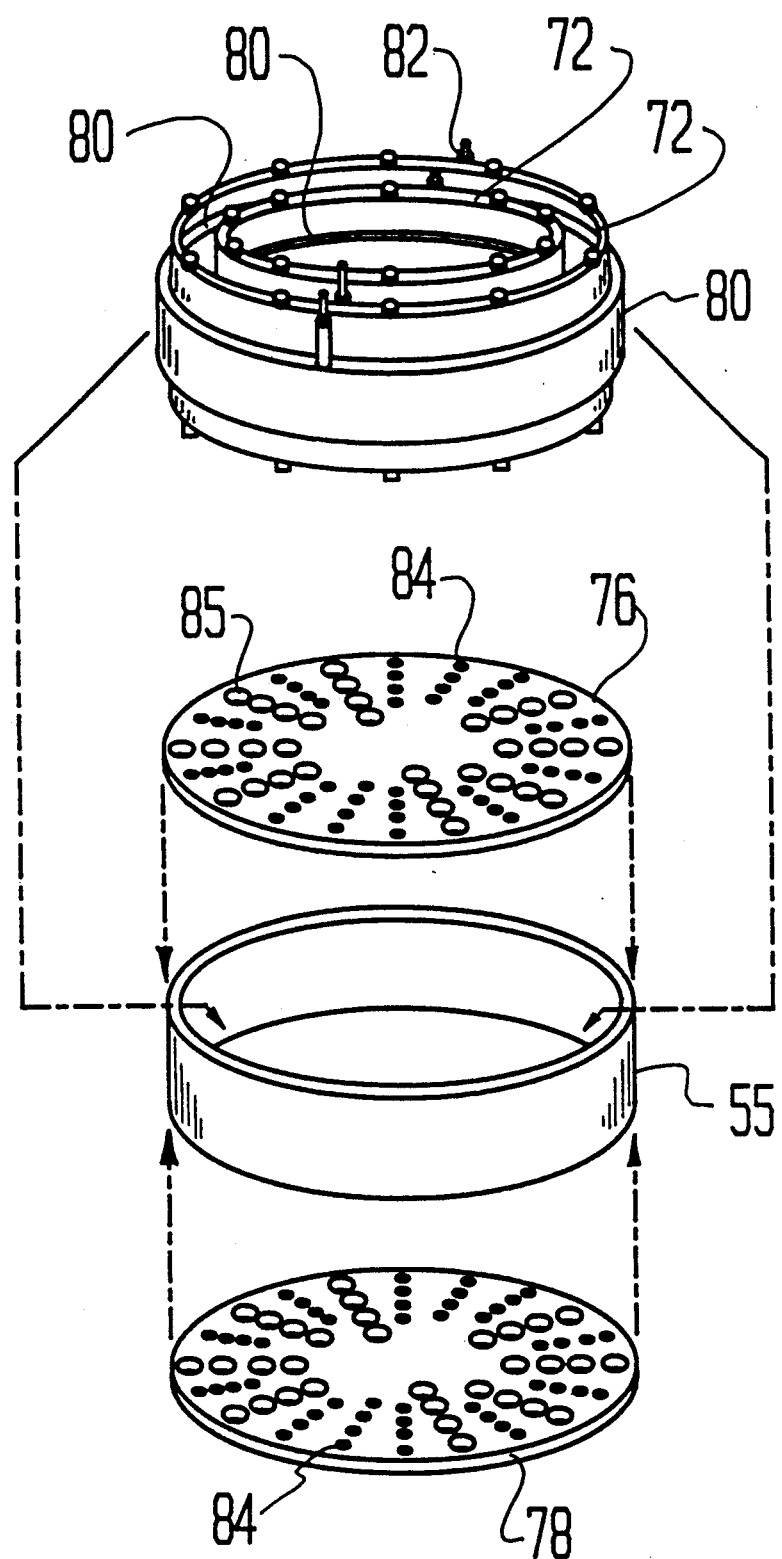
FIG. 5 is a configuration utilizing concentric rings or cylinders for the electrodes utilized in the fuel injector of the preferred embodiment.

Referring to FIG. 5, the flow through piston member comprises a sequence of concentric flat rings cylinders or bands 72. As with the first electrode configuration of FIGS. 4A–4D, the concentric flat rings, cylinders or bands 72, which may be constructed from a temperature resistant ceramic polymer fit within a cylindrical housing 55 and contain respective top and bottom perforated plate member 76, 78. Each ring is coated on opposite sides with a band electrode 80 which is then connected to either a positive and negative terminal 82 to holes 84 and through to an internal rod 77. In operation, electro-rheological fluid flows between the concentric electrode rings and into the upper portion of the housing. When the plunger member is electrified, a plurality of electric fields are created between the electrodes on the concentric bands thereby solidifying the electro-rheological fluid situated therebetween. As with the embodiment of FIGS. 4A-4D, upon the activation of an electrical impulse, the perforated plunger 55 transforms into a solid piston which compresses the remaining electro-rheological fluid in cavity 38a and locks the valve.

Figure 7:
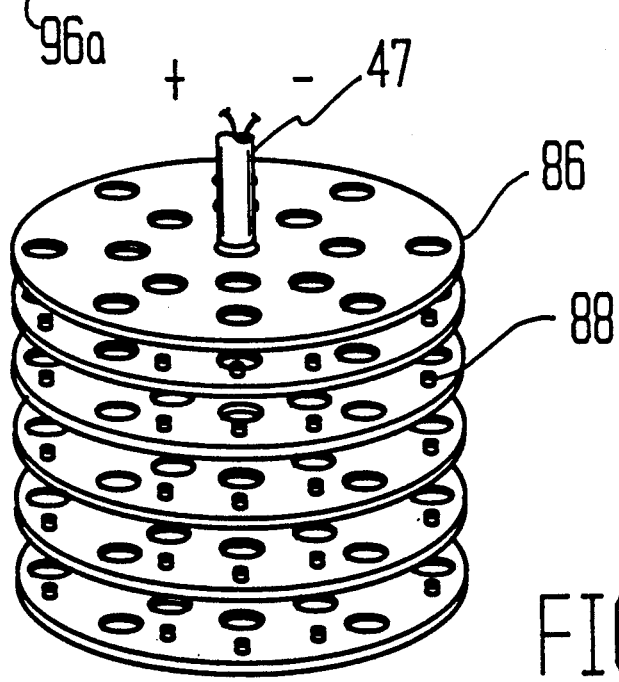
FIG. 7 illustrates an exploded view of the wafer electrode configuration to be utilized in the fuel injector of the preferred embodiment.
Figure 7A:
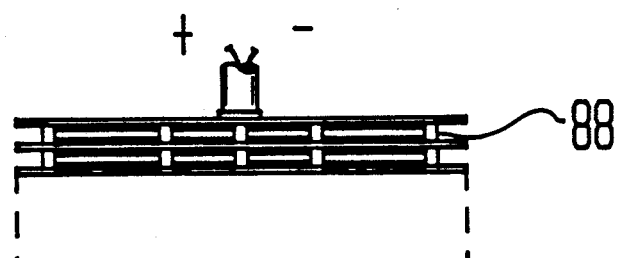
FIG. 7A is a section view of the wafer electrode configuration of the preferred embodiment.

Referring to FIGS. 7 and 7A, the perforated member contains a multiple sequence of perforated metallic disk-shaped wafers 86 through which the electro-rheological fluid flows. The wafers 86 form flow through screens, are configured alternatingly in a positive to negative relationship, and are retained in a non-contacting position by posts 88 or by separator ring washers. In this embodiment, the housing (not shown) may itself serve as the negative terminal, with alternating wafers being maintained in electrical contact with the housing. The positive wafers are electrically insulated from the negative piston head and are in contact with a positive terminal which is insulated from the housing and which extends through the rod 47. During operation, electro-rheological fluid flows through the parallel disposed disk shaped wafers. When the electrodes are activated, a multiplicity of electric fields are generated between the respective positive and negative terminals formed between the wafers. The electro-rheological member forms a solidified plunger. The solidified plunger compresses the remaining electro-rheological fluid thereby locking the position of the valve. The shear resistance of the fluid when electrified can be increased by off-setting the apertures.

Figure 6:
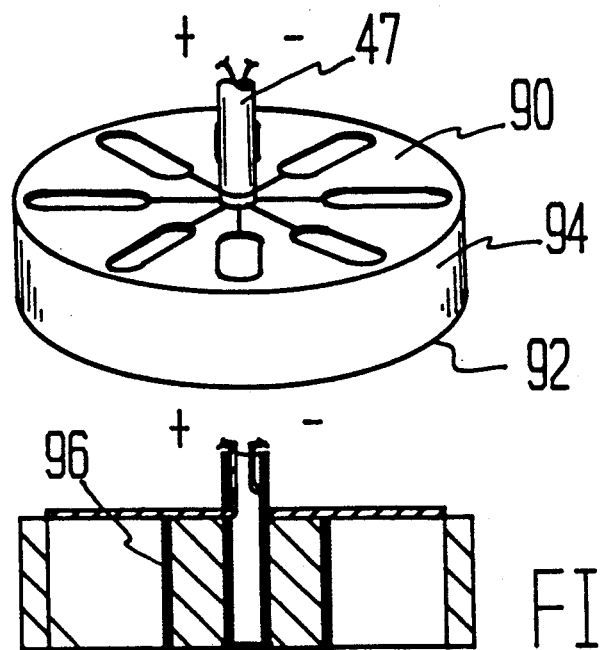
FIG. 6 is a perforated or flow through piston electrode configuration to be utilized in the fuel injector of the preferred embodiment.

A final embodiment of the electrode is illustrated in FIG. 6. As with the previous embodiments, the piston head comprises a cylindrical casing (which fits within housing 55 not shown) having perforated top and bottom members 90, 92. The casing contains a molded ceramic or temperature resistant plastic disk 94. Disk 94 contains numerous radially extending apertures through which electro-rheological fluid can flow and which are mated with the top and bottom members. The opposite sides of each radial aperture 96, 96a are parallel and equidistant and are coated or plated with copper or other conductive metal and function as respective positive and negative electrodes. The width of each aperture should be between 0.5 and 1.5 millimeters. Electro-rheological fluid flows through the oval apertures until electrified. When the electrodes are activated, the electro-rheological fluid contained within each aperture solidifies, and the flow through member forms a solid plunger.

It is to be appreciated by those skilled in the art that provision must be made for the volumetric changes in the electro-rheological fluid caused by thermal expansion. The valve of the present invention utilizes floating and expandable diaphragms 41 within the valve chamber 38a of FIG. 2 operating against an inert gas which will move or which will expand and contract with the volumetric changes. It is to be appreciated that other devices such as a rubber or neoprene balloon or ball filled with an inert gas such as nitrogen will perform this function. It is to be appreciated that diaphragm 41 may not be necessary in instances where chamber 44 is filled only partially with the electro-rheological fluid. In such instances, the space above the piston will serve as an expansion chamber.

The operation of the fuel injector of the present invention is now described. When the plunger 16 begins its descent, it initially covers the fuel-return port 21 during its downward descent. Fuel pressure begins to increase in the high pressure fuel chamber 12, overcomes supply pressure and closes supply check valve 19. As the plunger continues its thrust, fuel exerts pressure on the recirculation conduit on both the biased closed and biased open electro-rheological valves 32, 34. With the application of an electrical impulse to the electro-rheological fluid, biased closed valve 32 is locked, but biased open valve 34 is locked open. This allows fuel to exit through the biased open valve 34. During this condition there is insufficient pressure to lift the needle valve 26 and cause an injection event.

In order to obtain injection, the electrical potential to the electrode within the biased open valve 34 is decreased or shut off, thereby permitting the fuel pressure to increase to a controlled value. Full injection pressure is thereby achieved. The aforesaid produces modulated or two stage injection. As the plunger recedes, the check valve 19 opens, allowing fuel to be fed into the base of the injection chamber, thus preventing or minimizing vapor lock.

The aforesaid provides a reliable method for controlling the start of injection, while simultaneously regulating the initial volume of fuel required for a cleaner burn. In order to stop the injection of fuel at the determined point, the electro-rheological fluid is de-energized at the biased closed valve 32, thereby permitting fuel pressure to open the valve which in turn reduces pressure and closes the needle valve 26, thus ending injection.

In the event that voltage to either control valve is lost, there would be an open passage to return fuel and injection would be lost. The dotted line of the plunger (16' of FIG. 1) illustrates the maximum point of plunger travel. The inlet port is blocked off prior to reaching the point of extreme travel and therefore allows a metered amount of fuel to be injected to create an idle condition which will permit a safe and satisfactory travel to a repair station.

Figure 8:
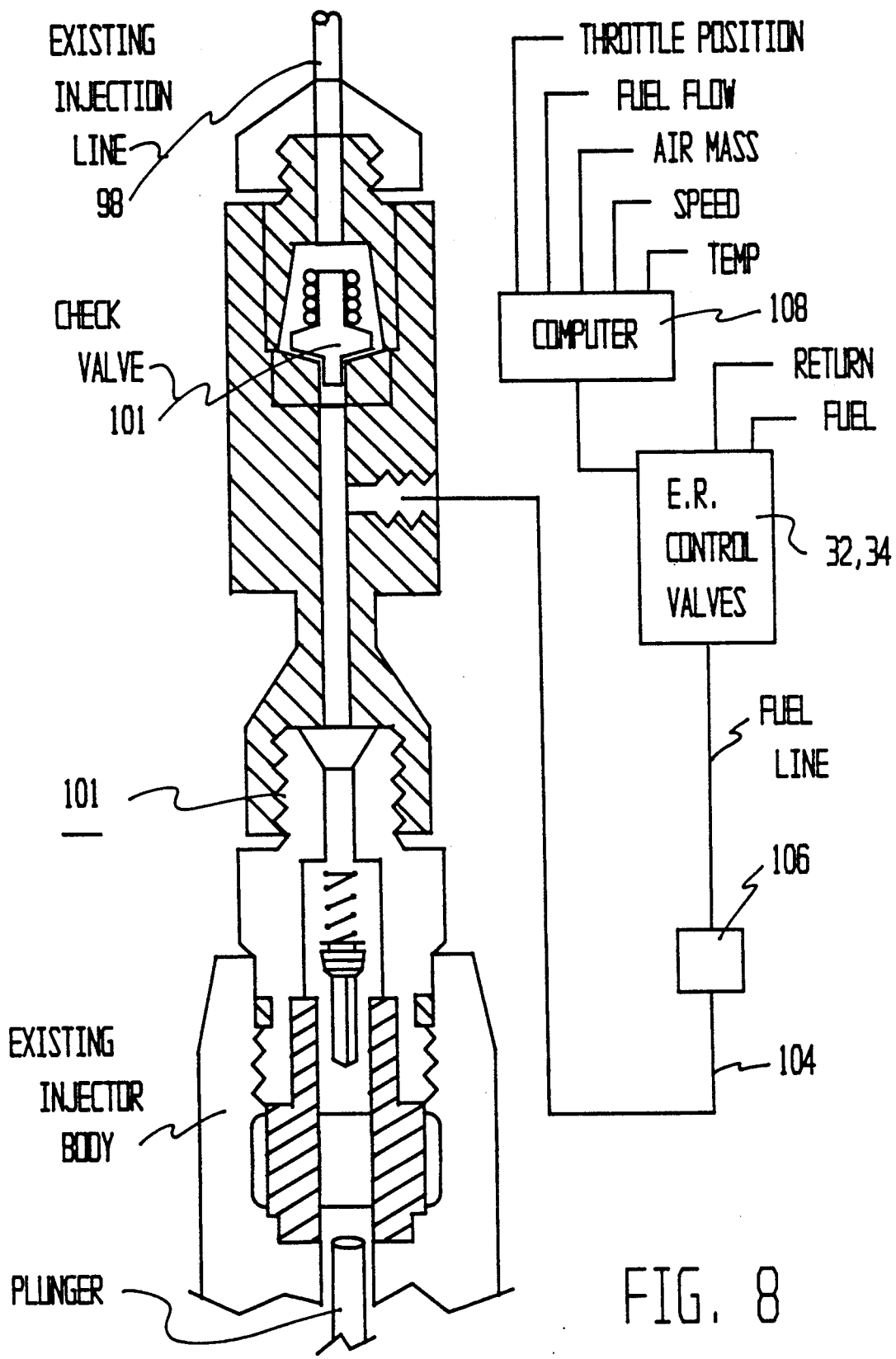
FIG. 8 is a section view of an alternative fuel injector for application in diesel engines.
Figure 9:
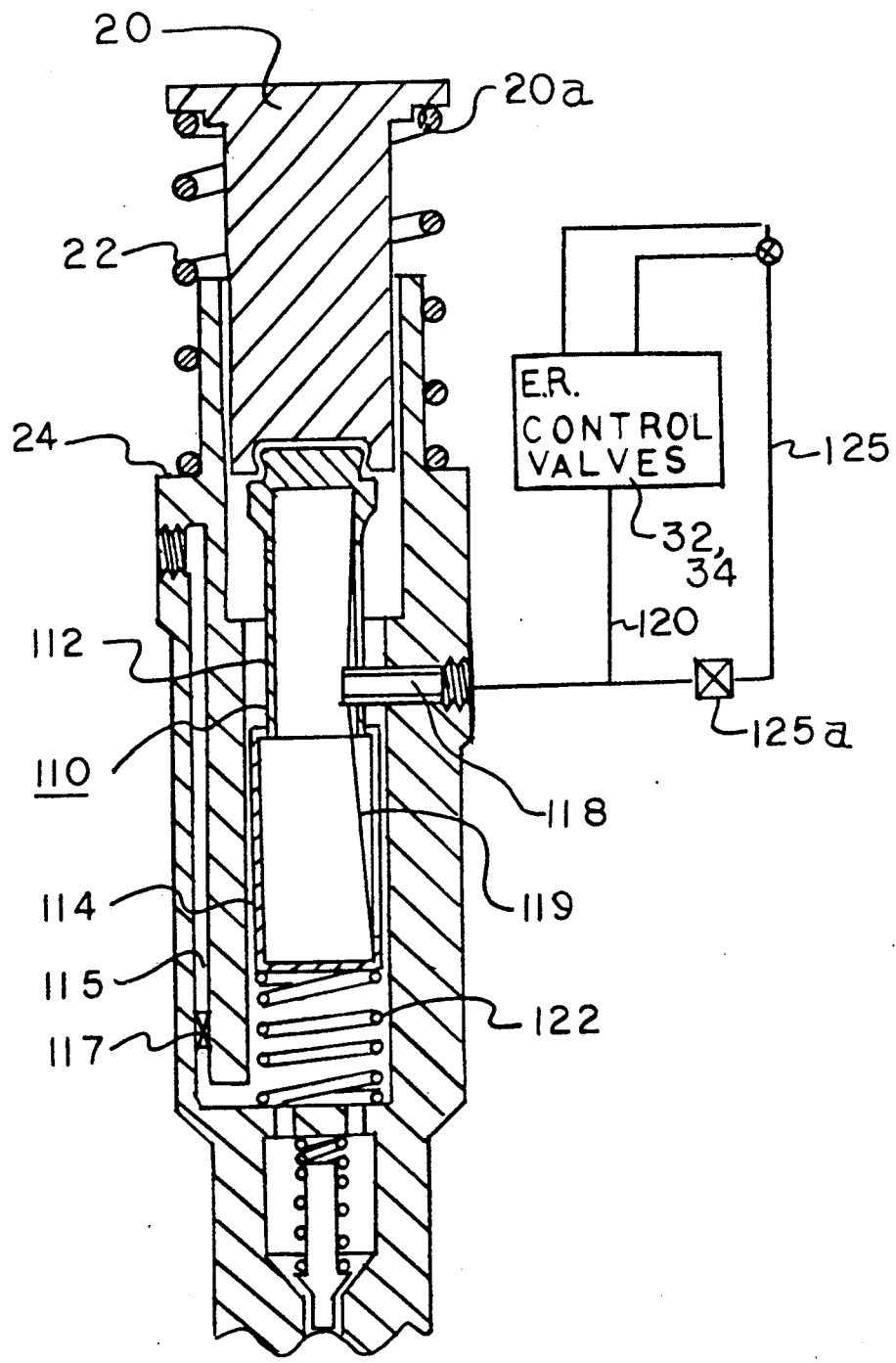
FIG. 9 is a section view of a second alternative fuel injector in accordance with the present invention which is utilized with hydraulic fluid and the electro-rheological control valves of the present invention.

FIG. 8 illustrates an alternative fuel injector which may be utilized in an existing diesel engine. Referring to FIG. 8, the diesel engine injection system is a shown along with the existing fuel injection pressure line. Fuel travels to injector nozzle through the existing fuel line 98 under normal injection pressure. The fuel proceeds out through the check valve 100 inside of a connecting body 102 into which is threaded a relief fuel return line 104. A solenoid valve 106 which is normally closed permits the existing conventional operation of the injection system. When the solenoid operated valve (normally closed) is activated, the existing injector assembly moves to a "full throttle" position. Accordingly, an actuator opens the existing throttle for maximum fuel injection. The maximum fuel flow is then modified or modulated through electro-rheological control valves 32, 34, which permit release of the fuel into the return fuel line as directed by an on-board computer. The electro-rheological control valves are identical to those disclosed in FIGS. 2 and 3.

The electro-rheological fuel injection valves 32, 34 control precise electronic control without modification of the existing diesel fuel injection system, and provide rapid and precise fuel quantity control, as well as more precise timing of the injection event.

It has been suggested that the clatter of diesel engines can be reduced by injecting a small amount of fuel ahead of the main injection event. The electro-rheological control system of the present invention can accommodate fuel injection modulation. Moreover, the controller can be linked with the quantity of oxygen available for each injection event by use of an air flow sensing device to signal the computer regarding the amount of air immediately available, which then is used by the computer to determine the timing and quantity of fuel to be injected. This can greatly reduce emissions and add to fuel economy and overall efficiency.

As noted above, the valving system shown in FIGS. 1, 2 and 3, comprises the electro-rheological control valves shown in FIG. 8. An on-board computer 108 factors inputs such as fuel flow, temperature, speed, throttle position, air mass or flow, and other variables to control the valves.

The fuel supply line check valve 19 shown illustrated in FIG. 1 is not used here, as its function is supplied by the existing injection pump. In this embodiment the electro-rheological control valves 32, 34 effectively function as an electro-rheological control system. The unit is incorporated in the line to the existing injection pump connecting between the delivery nozzle and the existing injection line to nozzle, as by a standard line nut. The passage body houses a standard check valve arrangement with the usual connection to accept the existing injection line. Its purpose is to permit the control valve to be tied into the system without any modifications.

As noted above, the cut-off valve 106 is solenoid operated, and is normally closed, allowing conventional operation of the existing pump; and also functioning as a fail-safe device because the solenoid is energized and open only during activation of electro-rheological control module. When solenoid operated cutoff valve 106 is open and the electro-rheological control modules are operational, the fuel control is set for full throttle, i.e. for maximum fuel injection of the existing unit; control is then provided by the electro-rheological control module.

The two electro-rheological valves operate as explained above in the description of FIGS. 2 and 3. In short, the electro-rheological control valves relieve the pressure through the existing injection line as dictated by the computer 108 to begin the instant of injection and to control the quantity of fuel injected by limiting the time of the injection event; which is cutoff by opening the second electro-rheological valve. The fuel thus is drawn off from the existing injector as dictated by the computer both as to the timing of the injection and the quantity of fuel injected, which will allow more precise electronic control.

FIGS. 9 and 10A-D illustrate a second alternative configuration of the present invention. This embodiment utilizes the casing and injection chamber of the preferred embodiment. The plunger 110 comprises two telescoping units 112, 114 which encase or enclose oil or other fluid. The telescoping members are keyed 116 so as to permit fluid to exit into a port 118 and flow path or channel 120 which is aligned with the keying, and which leads toward electro-rheological control valves 32, 34. The units are joined at the keying by a flexible elastomeric membrane or diaphragm 119 which supports the port 118 and which maintains a tight seal between the contracting and expanding telescoping members. Fuel is fed in through a fuel injection line 115. The fuel injection line 115 contains a one-way valve 117 which prevents fuel from being injected back out the fuel line during an injection event.

The second telescoping member 114 is biased upward by a biasing spring 122 which is situated within the injection chamber 124 fixed to the base of the injector unit. In operation, the cam, solenoid or other activation device imparts a downward force against piston member 20 and top telescoping member 112. The telescoping member 112 will thrust the fluid downward. A compressive fluid force is then created which can be imparted against telescoping member 114 or alternatively against the channel 120.

The channel 120 is in series with electro-rheological valving 32, 34, such as that disclosed in FIGS. 2 and 3. The electro-rheological valves 32, 34 when electrified, control the flow of liquid into the channel 120. Because the flow of fluid into the channels is impeded, the telescoping units do not converge, and the telescoping members operate as a solid plunger. The solid plunger then plunges downward and injects a quantity of fuel into the engine. A biasing spring within the casing biases the plunger upward. By controlling the electro-rheological valving 32, 34, the amount of oil or other fluid exiting the chamber can be fixed and the quantity of fuel precisely metered. The valving 32, 34 feed oil or fluid to a line 125 which permits the telescoping plunger to refill on the upstroke of the plunger. A one way valve 125a prevents fluid from being injected into line 125 during injection.

FIGS. 11-14 illustrate additional alternative configurations for the fuel injector of the present invention. In each of these embodiments, injection is carried out by a floating piston member which is separated from a plunger by a coil biasing spring which urges the two members apart. The space between the two members may be filled with either an electro-rheological fluid, hydraulic fluid, or oil. By controlling the amount of fluid between the two cooperating members, the distance between the two can be regulated. Thus both the timing and length (or distance) of the stroke of the floating piston can be controlled.

Figure 11:
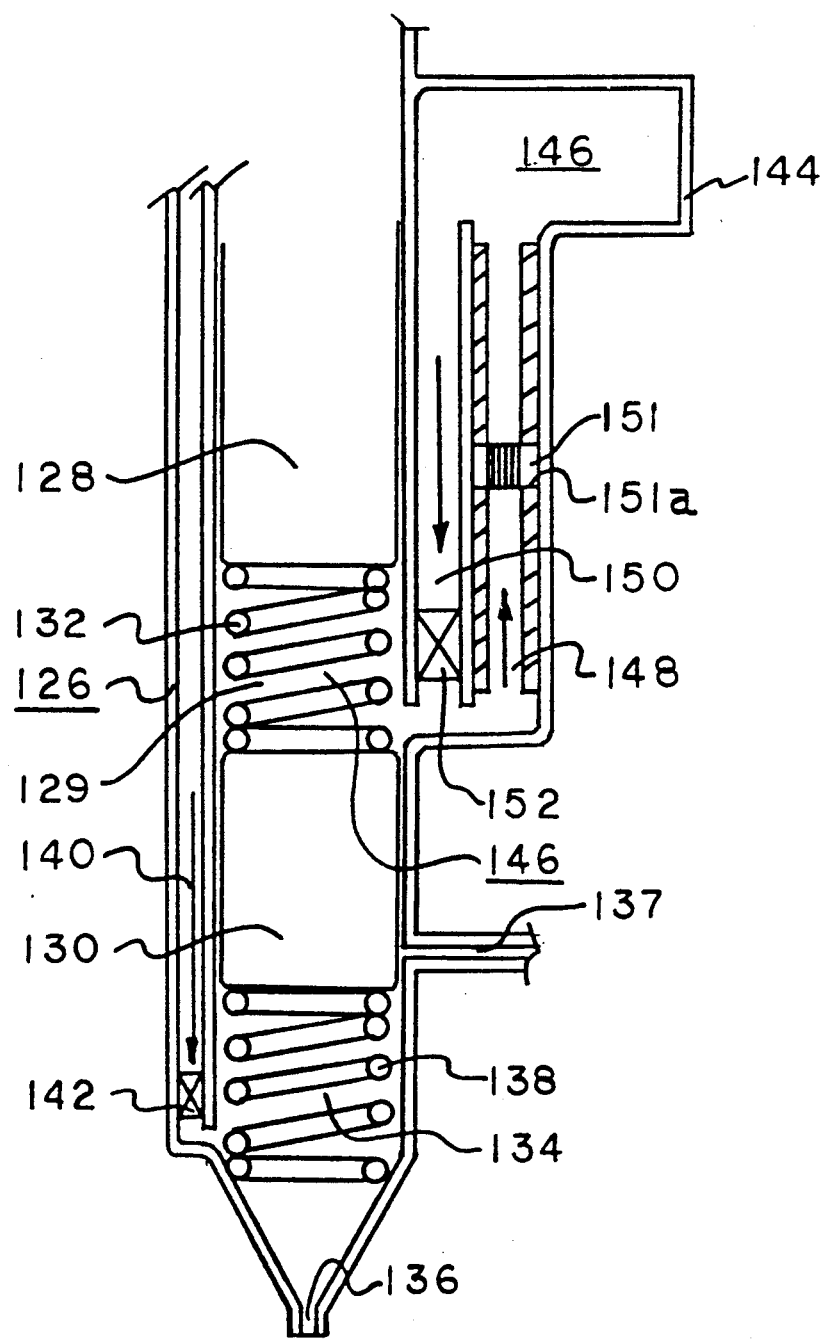
FIG. 11 is a section view of a third alternative embodiment of the fuel injector of the present invention.

Referring to FIG. 11, the fuel injector of the third alternative embodiment is shown. The injector comprises a casing 126 which houses a reciprocating plunger 128 and floating piston member 130. The plunger and floating piston member are separated by a biasing spring 132, and define a piston chamber 129 which is filled with electro-rheological fluid 146. The casing further defines an injection chamber 134, which is situated between an injection nozzle 136 and the floating piston member 130. A second biasing spring 138 separates the nozzle 136 and the floating piston member. The injector further includes a fuel line 140 which feeds fuel into the injection chamber 134. The fuel line includes a check valve 142 to prevent fuel from being injected back into the fuel line 140. A fuel outlet 137 permits fuel to exit the injection chamber.

The injector further contains a reserve chamber 144 which stores an electro-rheological fluid 146. The reserve chamber 144 communicates with the piston chamber 129 via an outlet passageway 148 and an inlet passageway 150. The inlet passageway contains a one way valve 152. The outlet contains a perforated electro-rheological electrode 151 (including outlet wires 151a) having one of configurations shown in FIGS. 4A-7.

In operation, fuel enters the injection chamber via fuel line 140. The reciprocating plunger 128 is depressed by the cam, solenoid or other mechanical activation means (not shown). The downward thrust of the plunger imparts a compressive fluid force within the piston chamber 129 which compresses against both the free floating piston member and the outlet passageway 148. As the plunger is depressed, electro-rheological fluid will attempt to enter the reserve chamber 144 through the outlet passageway 148 and the perforated electrode 151 containing one of the electrode configurations of FIGS. 4A–7.

By applying an electric potential to the electrode 151, flow through the outlet passageway is impeded and the thrust of the compressive fluid force is imparted against the free floating piston 130. The floating piston 130 is thrust downward, covers over fuel outlet 137, and injects fuel into the nozzle 136. On the upstroke, electro-rheological fluid re-enters the piston chamber from the inlet passageway 150 and one-way valve 152.

While the embodiment of FIG. 11 has been describe to utilize electro-rheological fluid and a perforate electrode having one of the electrode configurations of FIGS. 4A–7, it will be apparent to those skilled in the art that piston chamber 129 and reserve chamber 144 of this embodiment may utilize oil, hydraulic or other fluid, where the perforated electrode would be replaced by one or both the valves of FIGS. 2 and 3.

Figure 12:
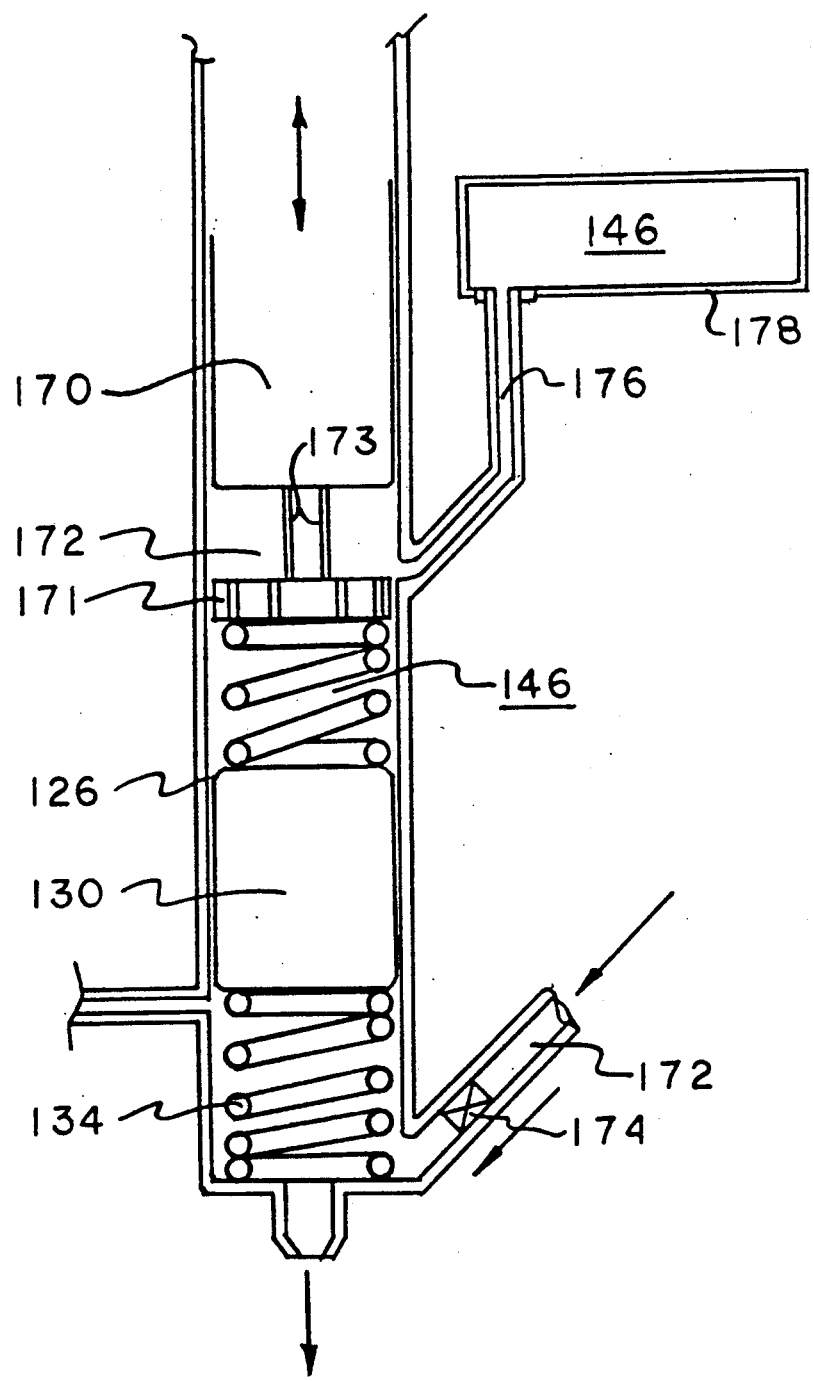
FIG. 12 is a section of a fourth alternative embodiment of the fuel injector of the present invention.
Figure 14:
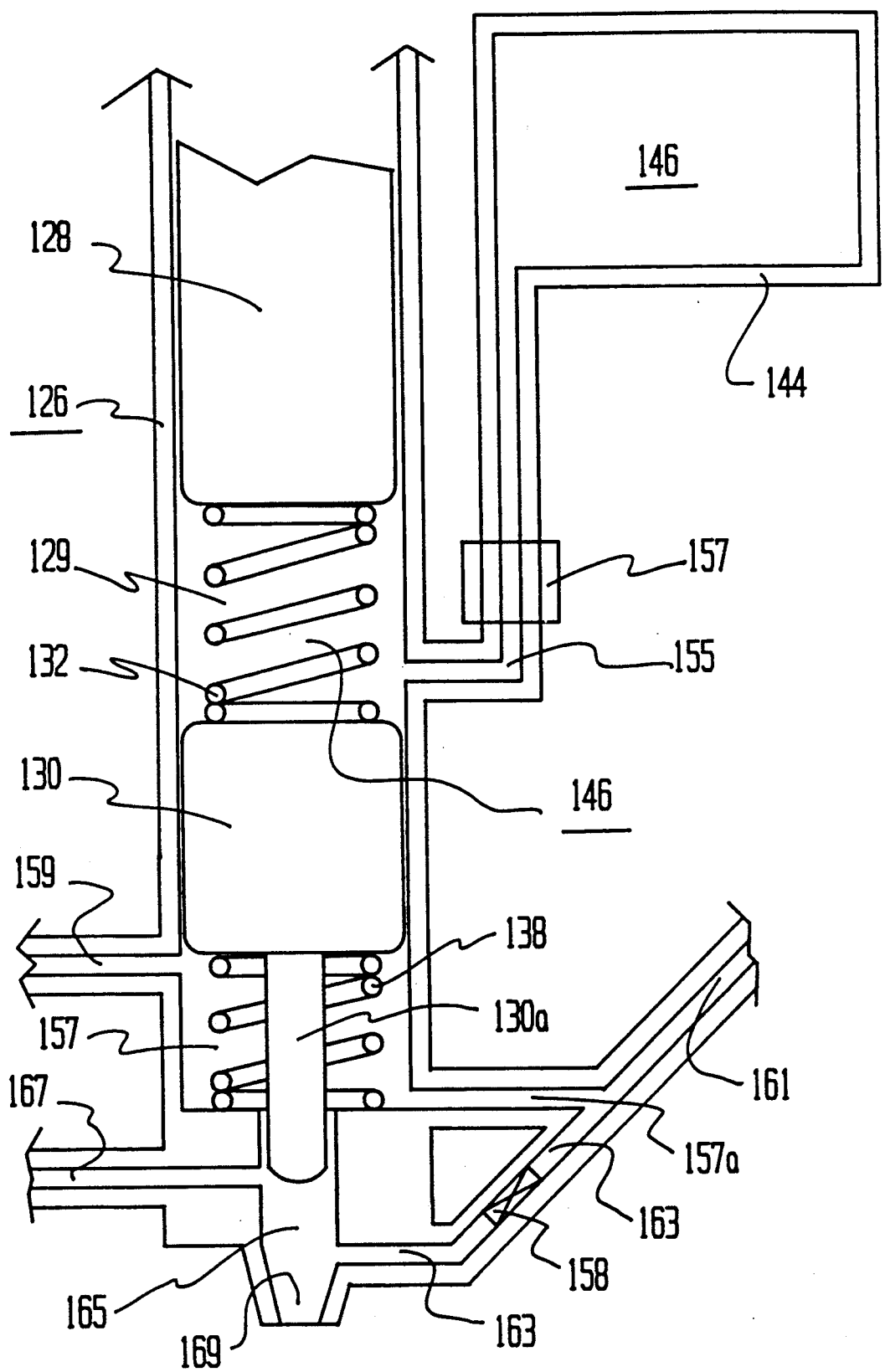
FIG. 14 is a section of a sixth alternative embodiment of the fuel injector of the present invention.

The embodiment of FIG. 14 is a modification of the embodiment of FIG. 11 which provides for greatly enhance injection pressure. The embodiment of FIG. 14 contains the casing 126, plunger 128, floating piston 130 and biasing springs 132, 138 of FIG. 11. In this embodiment, however, piston chamber 129 and the reserve chamber 144 are joined by a single conduit 155 controlled by an electrode 157 having one of the configurations shown in FIGS. 4A–7. In the embodiment of FIG. 12, greatly enhanced fuel injection pressure is created by the use of a small injection plunger 130a affixed to the floating piston 130.

In operation, fuel flows enters from fuel line 161 unrestricted through the injection chamber 157 at the bottom of that chamber 157a and exits through an exit port 159 at the top of that chamber, when the floating piston is completely retracted. When the floating piston 130 descends and covers the exit port 159, the fuel will tend to back into the fuel line 161. Fuel will then enter through an auxiliary channel 163, through a one-way valve 158 situated proximate to the bottom of a high pressure chamber 165 and exit through an exit port 167 at the very top of the chamber. During compression, port 167 is closed by the descending high pressure plunger 130a. The pressure increases, the one-way valve 158 prevents the exit of fuel back through auxiliary channel 163 and into the fuel line 161. The fuel is injected by high pressure injector 130a through the injection nozzle 169.

Figure 13:
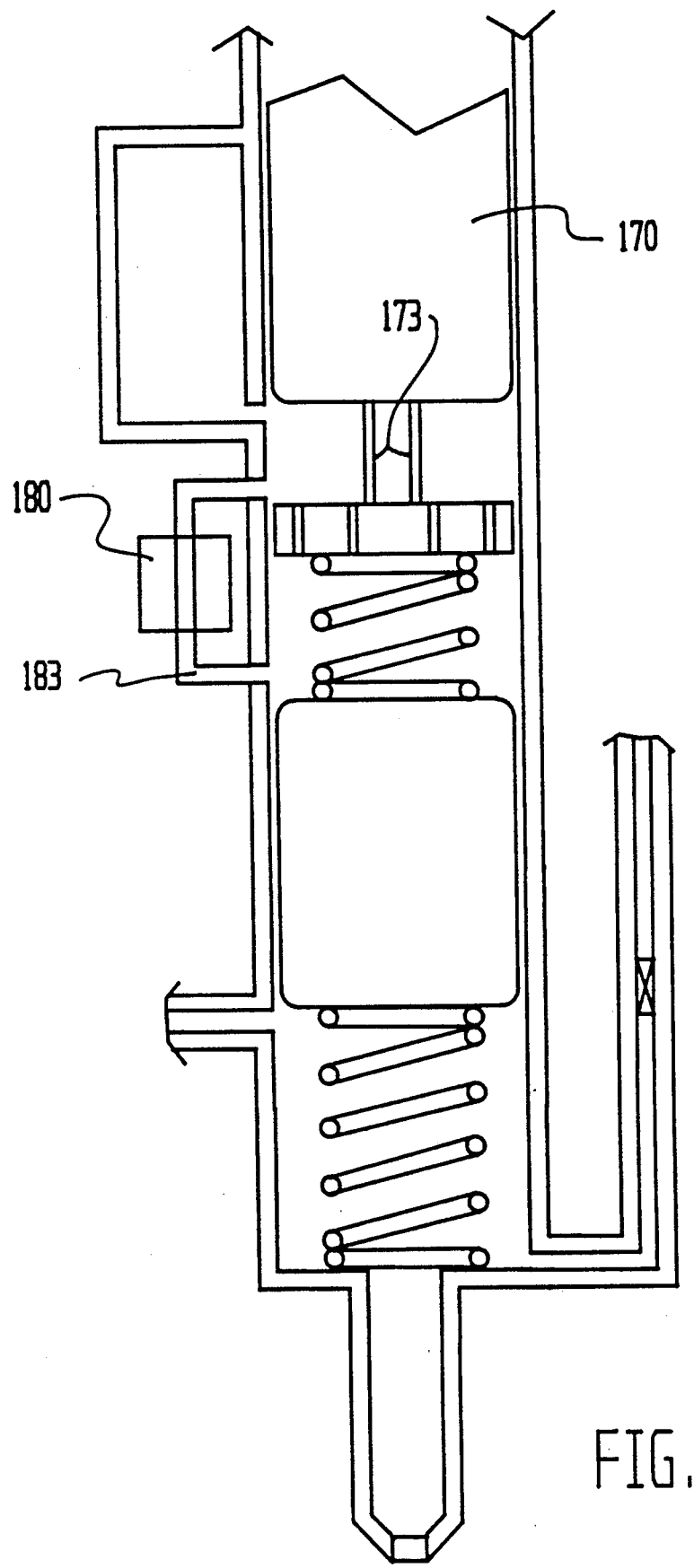
FIG. 13 is a section view of a fifth alternative embodiment of the fuel injector of the present invention.

FIGS. 12 and 13 illustrate two final embodiments of the fuel injector of the present invention. In each of these embodiments, the reciprocating plunger 170 contains a perforated electrode 171 having one of the configurations of FIGS. 4A–7 which may be selectively electrified and solidified to produce a compressive plunger.

Referring to FIG. 12, the fuel injector contains the housing 126, floating piston 130, injection chamber 134 and biasing springs of the embodiment of FIG. 11. In this embodiment, fuel enters the injection chamber 134 from a fuel line 172 via check valve 174. A fuel outlet line 175 permits fuel to exit at the top of the injection chamber. The reciprocating plunger 170 in this embodiment contains a throat 172 which attaches to the perforated plunger member 171. The perforated electrode 171 comprises one of the four electrode embodiments shown and described in FIGS. 4A–7. Electrode wires 173 extend up the throat from the perforated electrode 171. The piston chamber 129 contains electro-rheological fluid 146 and is connected via a conduit 176 to a reserve chamber 178 also containing electro-rheological fluid.

In operation, as the reciprocating plunger 170 is thrust downward, electro-rheological fluid contained within the piston chamber will flow through the perforated plunger 171. When an electrical signal is applied to the plunger, the electro-rheological fluid contained therein solidifies, thereby impeding further flow through the plunger. The descending solidified plunger then applies a compressive fluid force within the piston chamber 129 which is imparted against the free-floating piston 130. The fluid force drives the free-floating piston downward, thereby creating an injection event.

The embodiment of FIG. 13 is similar from an operational standpoint to the embodiment of FIG. 12. In this embodiment, an additional electrode 180 having one of the configurations shown in FIGS. 4A–7 is utilized in a by-pass conduit 182. The additional electrode provides a greater measure of injection control.

It is to be noted that compression or injection chambers in each of the embodiments of the present invention provide for separated fuel inlets and outlets. This feature enables the chamber to be constantly and completely filled with fuel, and also purged of vapor and foam by the continuous circulation (except during compression). This feature cools the unit, prevents vapor lock, and assures complete filling of the chamber.

Figure 15:
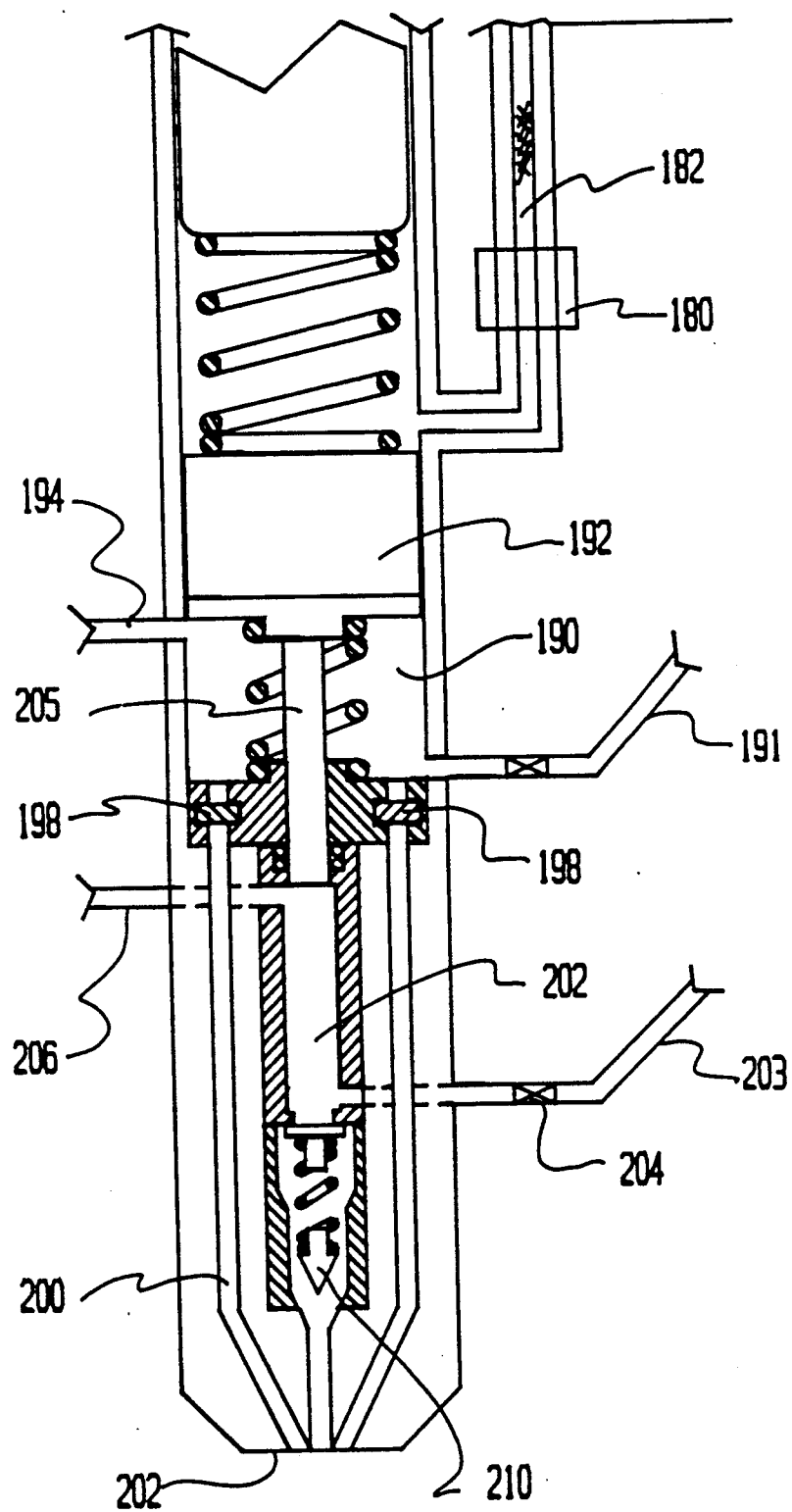
FIG. 15 is a section view of a seventh alternative embodiment of the present invention which utilizes air compression means.

FIG. 15 illustrates a final embodiment of the present invention. This embodiment utilizes the electrode configuration 180 of FIGS. 4A–7 within a bypass conduit 182. In this embodiment, air is compressed to further increase the intensity of the injection event. Air flows through air chamber 190 from air in port 191 when the piston is in the full expanded position. The piston 192 alternatively covers and uncovers the air-out port 194. When the piston 192 covers the air out port 194 or orifice, the orifice is closed thereby enabling air compression. The compressed air passes through the check valves 198 and is transmitted through passages 200 to the tip of the injector unit 202 where it flows out along with the fuel being injected. The compressed air serves to increase or magnify the intensity of the injection event. Preferably, the air is pressurized by an air pump (such as the pump furnishing air to the exhaust system to more completely burn the exhaust or by a separate air pump, etc. The air can be piped from an air cleaner, out of the engine crank case or out of the top portion of the fuel storage tank, thus salvaging any fuel fumes escaping into that space. While not essential, it is preferred that air circulate through the air pressure chamber to provide cooling.

Referring to the lower portion of FIG. 15, fuel enters the high pressure chamber 202 through fuel in line 203, moves through a one-way valve 204 and exits through a "fuel-out" port 206. During injection, the piston rod 205 descends, closes off port 198 and fuel is pressurized and fuel is pressurized and injected through the conventional injector 210 having a conventional pintle. It is preferred that the system circulate the fuel through the compression chamber using the fuel out line as that will purge the fuel pressure chamber of fumes, bubbles, etc. and avoid vapor lock; also it provides some cooling.

While the present invention has been described with reference to the above discussed embodiments, it is to be appreciated by those skilled in the art that other embodiments fall within the spirit and scope of the present invention and that the true nature and scope of the present invention is to be determined with reference to the Figures enclosed herewith.

What is claimed is:

1. A fuel injector controlled by electro-rheological valving comprising:
    a generally cylindrical casing having a compression chamber for holding a quantity of fuel and a nozzle for injecting said fuel into an engine;
    a fuel inlet for supplying a quantity of fuel to said compression chamber;
    a recirculation outlet coupled to said compression chamber for permitting fuel to exit said chamber to be recirculated back to said inlet;
    reciprocating plunger means within said casing for driving fuel into said nozzle and recirculation outlet; and
    electro-rheological valve means in communication with said recirculation outlet for controlling the flow of fuel through said outlet whereby the amount of fuel injected by said reciprocating plunger into said nozzle may be precisely metered.

2. The fuel injector of claim 1 wherein said electro-rheological valve means comprises;
    an oscillating valve member for opening and closing off said recirculation outlet, said valve member having a cavity containing an electro-rheological fluid;
    a perforated electrode located within said valve cavity, said valve member oscillating with respect to said perforated electrode; and
    means for electrifying said perforated electrode member such that the electro-rheological fluid within said electrode solidifies, whereby a compression fluid force is applied by said electrode member against the electro-rheological fluid within said cavity, thereby locking the position of said oscillating valve member.

3. A fuel injector controlled by an electro-rheological valve comprising;
    a generally cylindrical casing having a compression chamber for holding a quantity of fuel and a nozzle for injecting said fuel into an engine;
    a fuel inlet for supplying a metered quantity of fuel to said compression chamber;
    reciprocating telescoping plunger means housed within said chamber for driving said metered quantity of fuel into said nozzle, said telescoping plunger containing a fluid, the respective compression and decompression of said telescoping plunger being controlled by the movement of said fluid into and out of said plunger;
    air compression means within said generally cylindrical casing for increasing the intensity of said fuel injection; and
    electro-rheological valve means in series with said plunger for controlling the movement of said fluid into and out of said plunger, whereby the length of said plunger is varied and amount of fuel injected through said nozzle is adjusted.

4. The electro-rheological fuel injector of claim 2 wherein said perforated electrode member comprises a cylindrical disk having a plurality of apertures extending therethrough to permit the flow of electro-rheological fluid through said disk, each of said apertures containing a negative and positive electrode such that when said electrodes are activated, an electric field is generated in each aperture, thereby solidifying the electro-rheological fluid contained therein.

5. The electro-rheological fuel injector of claim 4 wherein the width of each said apertures is between 0.5 and 1.5 millimeters.

6. The electro-rheological fuel injector of claim 2 wherein said perforated electrode member comprises a spiral coil member contained within a perforated cylindrical casing, said spiral coil member containing positive and negative electrodes located on opposite sides of said spiral coil such that said spiral coil forms an alternating sequence of positive and negative terminals, whereby the application of an electrical impulse to said electrodes generates a plurality of electric fields within said spiral coil thereby solidifying the electro-rheological fluid located within said coil.

7. The electro-rheological fuel injector of claim 6 further comprising a plurality of rib members attached to said spiral for maintaining the electrical integrity of said spiral coil when it is placed within said perforated cylindrical casing.

8. The electro-rheological fuel injector of claim 2 wherein said perforated electrode comprises a plurality of concentric bands, each of said bands having a positive electrode on a first side and a negative electrode on a second side, the positive electrode on a first band being in proximity to a negative electrode on a second band, such that upon the application of an electric signal to said electrodes, a plurality of electric fields are formed between said bands and the electro-rheological fluid between said bands solidifies.

9. The electro-rheological fuel injector of claim 8 wherein said concentric bands are retained within a hollow cylindrical casing having top and bottom members, said top and bottom members being perforated so as to permit the flow of electro-rheological fluid through said cylindrical casing.

10. The electro-rheological fuel injector of claim 2 wherein said perforated electrode comprises a hollow casing supporting a plurality of parallel disposed perforated disk-shaped metallic wafer members, said metallic wafer members forming a sequence of alternating positive and negative electrodes such that upon the application of an electrical impulse to said wafer members, a plurality of electric fields is formed between said alternating wafer members, thereby solidifying the electro-rheological fluid situated therebetween.

11. The electro-rheological fuel injector of claim 2 further comprising means for compensating for the thermal and volumetric changes of the electro-rheological fluid within said cavity.

12. The electro-rheological fuel injector of claim 11 wherein said compensating means is a flexible diaphragm.

13. A fuel injector controlled by electro-rheological valving comprising:
    a cylindrical casing having a compression chamber for holding a quantity of fuel and a nozzle for injecting said fuel into an engine;
    a fuel inlet for supplying a quantity of fuel to said compression chamber;
    means for preventing vapor lock within said compression chamber;
    a recirculation outlet coupled to said compression chamber for permitting fuel to exit said chamber to be recirculated back to said fuel inlet;
    reciprocating plunger means for driving fuel into said nozzle and recirculation outlet;

means for biasing said plunger means in a first direction;

first electro-rheological valve means biased in a first direction, said valve means communicating with said recirculation outlet and controlling the flow of fuel through said recirculation outlet;

second electro-rheological valve means biased in a second direction, said valve means communicating with said recirculation outlet and controlling the flow of fuel through said recirculation outlet, whereby the amount of fuel loaded into said nozzle is precisely metered by said first and second electro-rheological valve means.

14. The electro-rheological fuel injector of claim 13 wherein said first and second electro-rheological valves are controlled by processor means.

15. The fuel injector of claim 13 wherein said first electro-rheological valve comprises;

a casing laterally aligned with said recirculation line, said casing providing a passageway for fuel between said fuel injector and said fuel inlet line;

a slidable valve means for opening and closing off said casing to the flow of fuel;

means for biasing said valve towards a closed position;

electro-rheological control means operatively coupled to said valve for controlling the movement of said valve between an opened and closed position 16. The fuel injector of claim 13 wherein said first electro-rheological valve comprises;

a casing laterally aligned with said recirculation line, said casing providing a passageway for fuel between said fuel injector and said fuel inlet line;

a slidable valve means for opening and closing off said casing to the flow of fuel;

means for biasing said valve towards an open position;

electro-rheological control means operatively coupled to said slidable valve means for controlling the movement of said valve between an open and closed position.

17. A fuel injector controlled by electro-rheological valving comprising:

a cylindrical casing having a compression chamber for holding a quantity of fuel and a nozzle for injecting said fuel into an engine;

a fuel inlet for supplying a quantity of fuel to said compression chamber;

a reciprocating plunger means within said casing, said plunger compressing and decompressing a body of electro-rheological fluid contained within said casing;

a free-floating piston member contained within said casing and separated from said plunger by said electro-rheological fluid, said free floating piston member being driven into said compression chamber by the compressive fluid force of said electro-rheological fluid imparted by said reciprocating plunger, said free-floating piston injecting fuel into said nozzle;

an outlet conduit for said electro-rheological fluid compressed by said reciprocating plunger;

electro-rheological control means in communication with said outlet conduit for controlling the flow of electro-rheological fluid through said outlet conduit whereby the compressive fluid force of said electro-rheological fluid imparted against said free-floating piston may be controlled, and the amount of fuel injected into said nozzle by said free-floating piston is metered.

18. A fuel injector controlled by electro-rheological valving comprising:

a cylindrical casing holding a body of electro-rheological fluid, said casing further having a compression chamber for holding a quantity of fuel, and a nozzle for injecting said fuel into an engine;

a fuel inlet for supplying a quantity of fuel to said compression chamber;

plunger means situated at one end of said casing, said plunger means reciprocating alternatingly toward and away from said body of electro-rheological fluid contained within said casing;

a reciprocating perforated electrode member coupled to said plunger means, said perforated electrode member reciprocating within said body of electro-rheological fluid;

a free-floating piston member contained within said casing and separated from said perforated electrode member by said electro-rheological fluid, said free floating piston member being driven into said compression chamber by the compressive force fluid of said electro-rheological fluid imparted by said reciprocating perforated electrode, said driven free-floating piston injecting fuel into said nozzle; and means coupled to said perforated electrode member for generating an electric field within said perforated member such that the electro-rheological fluid within said perforated member solidifies, and said reciprocating electrode imports a greater compressive fluid force against said free floating piston.

19. The electro-rheological fuel injector of claim 18 wherein said perforated electrode member comprises a cylindrical disk having a plurality of apertures extending therethrough to permit the flow of electro-rheological fluid through said disk, each of said apertures containing a negative and positive electrode such that when said electrodes are activated, an electric field is generated in each aperture, thereby solidifying the electro-rheological fluid contained therein.

20. The electro-rheological fuel injector of claim 19 wherein the width of each said apertures is between 0.5 and 1.5 millimeters.

21. The electro-rheological fuel injector of claim 18 wherein said perforated electrode member comprises a spiral coil member contained within a perforated cylindrical casing, said spiral coil member containing positive and negative electrodes located on opposite sides of said spiral coil such that said spiral coil forms an alternating sequence of positive and negative terminals, whereby the application of an electrical impulse to said electrodes generates a plurality of electric fields within said spiral coil thereby solidifying the electro-rheological fluid located within said coil.

22. The electro-rheological fuel injector of claim 21 further comprising a plurality of rib members attached to said spiral for maintaining the electrical integrity of said spiral coil when it is placed within said perforated cylindrical casing.

23. The electro-rheological fuel injector of claim 18 wherein said perforated electrode comprises a plurality of concentric bands, each of said bands having a positive electrode on a first side and a negative electrode on a second side, the positive electrode on a first band being in proximity to a negative electrode on a second band, such that upon the application of an electric signal to said electrodes, a plurality of electric fields are formed between said bands and the electro-rheological fluid between said bands solidifies.

24. The electro-rheological fuel injector of claim 23 wherein said concentric bands are retained within a hollow cylindrical casing having top and bottom members, said top and bottom members being perforated so as to permit the flow of electro-rheological fluid through said cylindrical casing.

25. The electro-rheological fuel injector of claim 18 wherein said perforated electrode comprises a hollow casing supporting a plurality of parallel disposed perforated disk-shaped metallic wafer members, said metallic wafer members forming a sequence of alternating positive and negative electrodes such that upon the application of an electrical impulse to said wafer members, a plurality of electric fields is formed between said alternating wafer members, thereby solidifying the electro-rheological fluid situated therebetween.

* * * * *

UNITED STATES PATENT AND TRADEMARK OFFICE
CERTIFICATE OF CORRECTION

PATENT NO.  : 5,019,119
DATED       : May 28, 1991
INVENTOR(S) : Nicholas S. Hare, Sr.

It is certified that error appears in the above-identified patent and that said Letters Patent is hereby corrected as shown below:

Column 5, line 54, replace "divide" with --divided--

Column 7, line 25, after "electro-rheological" add --fluid within the piston head solidifies and the piston--

Signed and Sealed this

Twentieth Day of October, 1992

*Attest:*

DOUGLAS B. COMER

*Attesting Officer*    *Acting Commissioner of Patents and Trademarks*